US006080231A

United States Patent [19]

Merten et al.

[11] Patent Number: 6,080,231

[45] Date of Patent: Jun. 27, 2000

[54] MODELING COMPOSITION WITH COLORED COTTON

[75] Inventors: Brian Merten, Exeter; Linwood E. Doane, Jr., Cumberland, both of R.I.

[73] Assignee: Hasbro, Inc., Pawtucket, R.I.

[21] Appl. No.: 09/095,600

[22] Filed: Jun. 11, 1998

[51] Int. Cl.[7] ................................ C08L 1/02; C08L 3/02; C08L 89/00

[52] U.S. Cl. ..................................... 106/126.1; 106/126.2; 106/162.5; 106/162.9; 106/163.01

[58] Field of Search .............................. 106/126.1, 126.2, 106/162.5, 162.9, 163.01

[56] References Cited

U.S. PATENT DOCUMENTS

| | | |
|---|---|---|
| 1,777,161 | 9/1930 | Biddle . |
| 2,096,684 | 10/1937 | Neufeld . |
| 2,127,298 | 8/1938 | Isaacs . |
| 2,269,509 | 1/1942 | Batelja . |
| 2,450,258 | 9/1948 | Skolnik . |
| 3,167,440 | 1/1965 | McVicker et al. . |
| 3,607,332 | 9/1971 | Wingfield . |
| 3,804,654 | 4/1974 | Liu . |
| 4,172,054 | 10/1979 | Ogawa et al. . |
| 4,386,964 | 6/1983 | Herbert . |
| 4,735,660 | 4/1988 | Cane . |
| 4,840,669 | 6/1989 | Hughes et al. . |
| 4,840,670 | 6/1989 | Hughes et al. . |
| 4,859,242 | 8/1989 | Hughes et al. . |
| 4,990,013 | 2/1991 | Hejmanowski . |
| 5,171,766 | 12/1992 | Mariano et al. . |
| 5,258,068 | 11/1993 | Shapero et al. . |
| 5,310,421 | 5/1994 | Shapero et al. . |

FOREIGN PATENT DOCUMENTS

| | | |
|---|---|---|
| 2068548 | 8/1997 | United Kingdom . |

*Primary Examiner*—David Brunsman
*Attorney, Agent, or Firm*—Fish & Richardson, PC

[57] ABSTRACT

A modeling composition includes a moldable base material and small pieces of colored cotton in the form of fabric or paper mixed into the moldable base material. The modeling composition may be made by providing a moldable base material, providing small pieces of colored fabric or paper made from a colored fabric or paper, and mixing the small pieces of colored fabric or paper into the moldable base material.

25 Claims, 1 Drawing Sheet

MODELING COMPOSITION WITH COLORED COTTON

TECHNICAL FIELD

The invention relates to modeling compositions.

BACKGROUND

Modeling compositions may be used by artists and children to create shapes, such as of animals, or sculptures. A modeling composition may include pigments, dyes, or other materials that enhance its visual appeal. For instance, a modeling composition may include particulate glitter material that makes it glitter or sparkle. The glitter material may be made from a plastic or mica, and may provide dull or bright refection of light.

SUMMARY

In one general aspect, a modeling composition may include a moldable base compound mixed with small pieces of colored cotton. Embodiments may include one or more of the following. For example, the moldable base compound may be flour based and include flour, water, salt, colorant, and fungicide. The small pieces of colored fabric or paper may be a cotton bond paper that may have between 20% and 100% cotton by weight or, more typically, between 80% and 100% cotton by weight. They also may be a fabric, such as a polyester knit or tricotton blend.

The small pieces of colored cotton may be colored by a colorant material, such as a pigment or fixed dye, that does not bleed in the moldable base material. The colorant material may be a complementary color of the color of the moldable base material. The small pieces may be in a size range between 2 mm by 2 mm and 1 mm by 3 mm, and may be shaped as squares, circles, rectangles, triangles or stars.

In another general aspect, a modeling composition may be made by providing a moldable base material, providing small pieces of colored cotton in the form of colored fabric or paper, and mixing the small pieces of colored cotton into the moldable base material.

Embodiments may include one or more of the preceding or following features. For example, the method may include cutting the colored cotton into the small pieces.

In another general aspect, a modeling composition includes a moldable base material having flour and water and small pieces of colored cotton bond paper having between 80% and 100% by weight of cotton and being colored by a colorant material that does not bleed in the moldable base material.

Other features and advantages will be apparent from the following description, including the drawings, and from the claims.

DESCRIPTION

Figure 1:
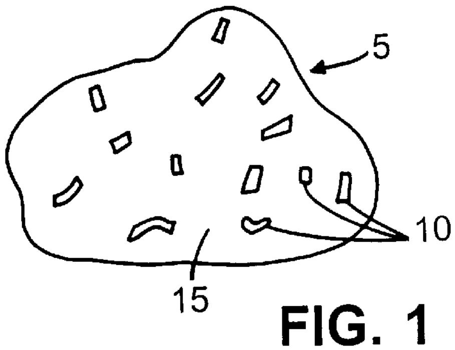
FIG. 1 is a perspective view of a modeling composition having small pieces of colored cotton.

Referring to FIG. 1, a modeling composition 5 may include small pieces of colored cotton 10 mixed into a moldable base material 15. The moldable base material 15 may be a flour-based material, such as a material formed from flour, water, salt, colorant, and a fungicide, where the fungicide serves to prevent degradation. In general, the composition of the modeling composition 5 is approximately 99% moldable base material 15 and 1% small pieces of colored cotton 10. In some implementations, the amount of colored cotton 10 may be as high as 10%.

The colored cotton 10 may be colored cotton bond paper or a colored fabric, such as a polyester knit or tricotton blend. The percentage of cotton in the colored cotton bond paper generally is in a range between 100% and 80%. Testing has indicated that colored cotton 10 in the form of colored cotton bond paper with only 20% cotton can function in the modeling composition. However, paper having a higher percentage of cotton generally is used because cotton weighs less than paper. Although other materials, such as latex fibers and glitter, may be added to the moldable base material 15, paper offers considerable advantages. For example, paper avoids the allergic sensitivity that some people have to latex and that can lead to serious adverse effects when they have skin contact with latex. In addition, paper does not face the regulatory obstacles associated with, for example, glitter particles that are defined as small parts by the Consumer Product Safety Commission. Thus, paper does not require an exemption of the rule that forbids using small parts in children's toys.

Figure 2:
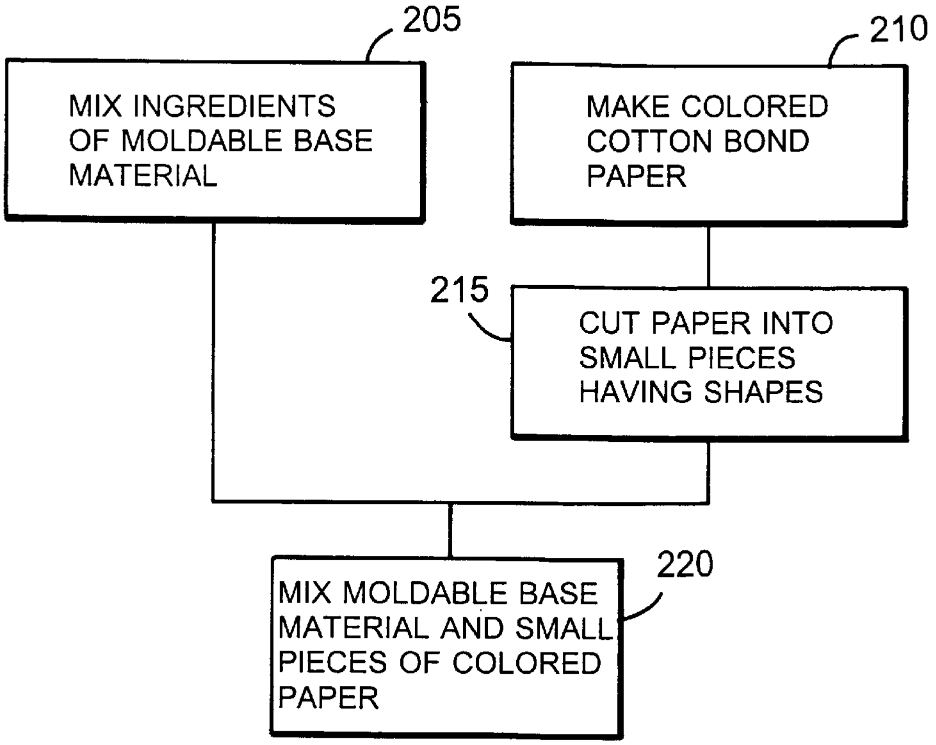
FIG. 2 is a flow chart illustrating the process of making the modeling composition of FIG. 1.

The modeling composition 5 having small pieces of colored cotton in the form of colored cotton bond paper is made according to the process illustrated in FIG. 2. In separate steps, the moldable base material 15 is mixed (step 205) and the colored cotton bond paper is prepared (step 210). The colorant must not bleed into the moldable base material. Because some water-based dyes have the tendency to bleed out of the paper when mixed with water-based moldable base material 15, the cotton bond paper is colored with colorants, such as pigments or fixed dyes, that do not bleed into the moldable base material 15. The colorant may be chosen from a variety of colors to provide a particular color to the sheet. When complementary colors are chosen, the color contrast between the base molding material 5 and the small pieces of colored cotton 10 provides a visually pleasing effect. For example, a pleasing effect is obtained if the moldable base material is colored yellow and the small pieces of colored cotton 10 have a complementary color (e.g., red). This effect is enhanced further by the translucence certain colors, such as yellow, impart to the moldable base material 15. If the pieces of colored cotton have a complementary color, they can be seen even when they are slightly below the surface of the moldable base material 15. Suitable pigments may be obtained from Day-Glo Color Corporation of Cleveland, Ohio.

Figure 3:
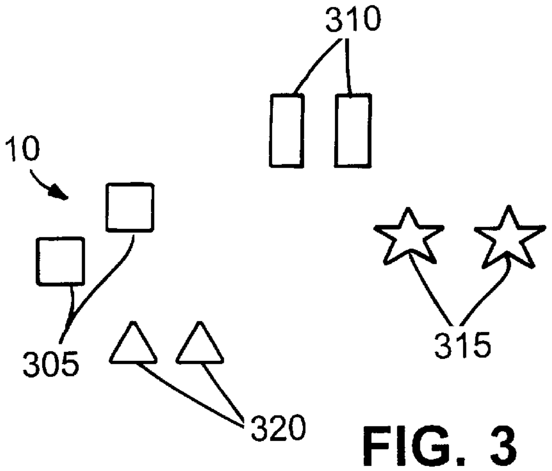
FIG. 3 is front view of shapes of colored cotton in the composition of FIG. 1.

Referring also to FIG. 3, the colored cotton bond paper is cut (step 215) into small pieces of colored paper 10 using conventional techniques. The small pieces of colored paper 10 may be of any size, but generally the sizes are between 2 mm by 2 mm and 1 mm by 3 mm. Although the small pieces typically are in the shape of squares 305 or rectangles 310, the colored cotton bond paper may be cut into other shapes, such as stars 315 or triangles 320. Shapes more intricate than squares 305 and rectangles 310 may be more expensive to produce due to the portion of the colored paper that may need to be discarded in the cutting process.

After the colored cotton bond paper is cut into the small pieces 10, they are mixed into the moldable base material 15 using standard mixing techniques until the small pieces 10 are evenly dispersed throughout the base material 15 (step

220). The resulting modeling composition 5 is easily moldable into various shapes, with the small pieces of colored cotton 10 on the surface of the molded shape (FIG. 1) enhancing the visual appearance of the molded shape.

During handling of the composition 5, the small pieces 10 stay in the moldable base material 15 as a result of the moldable base material wetting the cotton. Also, a high percentage of cotton in the small pieces 10, such as between 80% and 100%, results in cotton fibers on the surface of the small pieces 10 that are mechanically entrapped by the moldable base material.

In other implementations, the modeling composition 5 may include base moldable materials 15 made from clays or gels. In general, the small pieces of colored cotton 10 will function in water-based systems and cross linking systems.

Other embodiments are within the scope of the following claims.

What is claimed is:

1. A modeling composition comprising:

a moldable base material; and small pieces of colored cotton mixed into the moldable base material.

2. The modeling composition of claim 1, wherein the moldable base material is flour based.

3. The modeling composition of claim 2, wherein the moldable base material includes flour and water.

4. The modeling composition of claim 3, wherein the moldable base material includes flour, water, salt, colorant, and fungicide.

5. The modeling composition of claim 1, wherein the colored cotton comprises a polyester knit or tricotton blend.

6. The modeling composition of claim 1, wherein the colored cotton comprises a cotton bond paper.

7. The modeling composition of claim 6, wherein the cotton comprises between 20% and 100% by weight of the small pieces of colored cotton bond paper.

8. The modeling composition of claim 7, wherein the cotton comprises between 80% and 100% by weight of the small pieces of colored cotton bond paper.

9. The modeling composition of claim 1, wherein the small pieces of colored fabric or paper are colored by a colorant that does not bleed in the moldable base material.

10. The modeling composition of claim 9, wherein the colorant comprises a fixed dye.

11. The modeling composition of claim 9, wherein the colorant comprises a pigment.

12. The modeling composition of claim 9, wherein the colorant comprises a complementary color of a color of the moldable base material.

13. The modeling composition of claim 1, wherein the small pieces of colored fabric or paper have a size between 2 mm by 2 mm and 1 mm by 3 mm.

14. A method of making a modeling composition, the method comprising:

providing a moldable base material, providing small pieces of colored cotton, and mixing the small pieces of colored cotton into the moldable base material.

15. The method of making a modeling composition of claim 14, further comprising cutting colored cotton into the small pieces of colored cotton.

16. The method of claim 15, wherein the colored cotton comprises a polyester knit or tricotton blend.

17. The method of claim 15, further comprising coloring the small pieces of colored cotton using a colorant that does not bleed into the moldable base material.

18. The method of claim 17, wherein the colorant comprises a pigment.

19. The method of claim 17, wherein the colorant comprises a fixed dye.

20. The method of claim 14, wherein the moldable base material is flour based.

21. The method of claim 14, wherein the moldable base material includes flour and water.

22. The method of claim 14, wherein the colored cotton comprises a cotton bond paper.

23. The method of claim 22, wherein the cotton comprises between 20% and 100% by weight of the small pieces of colored cotton bond paper.

24. The method of claim 22, wherein the cotton comprises between 80% and 100% by weight of the small pieces of colored cotton bond paper.

25. A modeling composition comprising:

a moldable base material including flour and water; and small pieces of colored cotton bond paper including between 80% and 100% by weight of cotton and being colored by a colorant that does not bleed in the moldable base material.

* * * * *